July 17, 1934.   W. J. GOURLEY ET AL   1,966,665
C-LINK AND LOCK THEREFOR
Filed Feb. 16, 1934
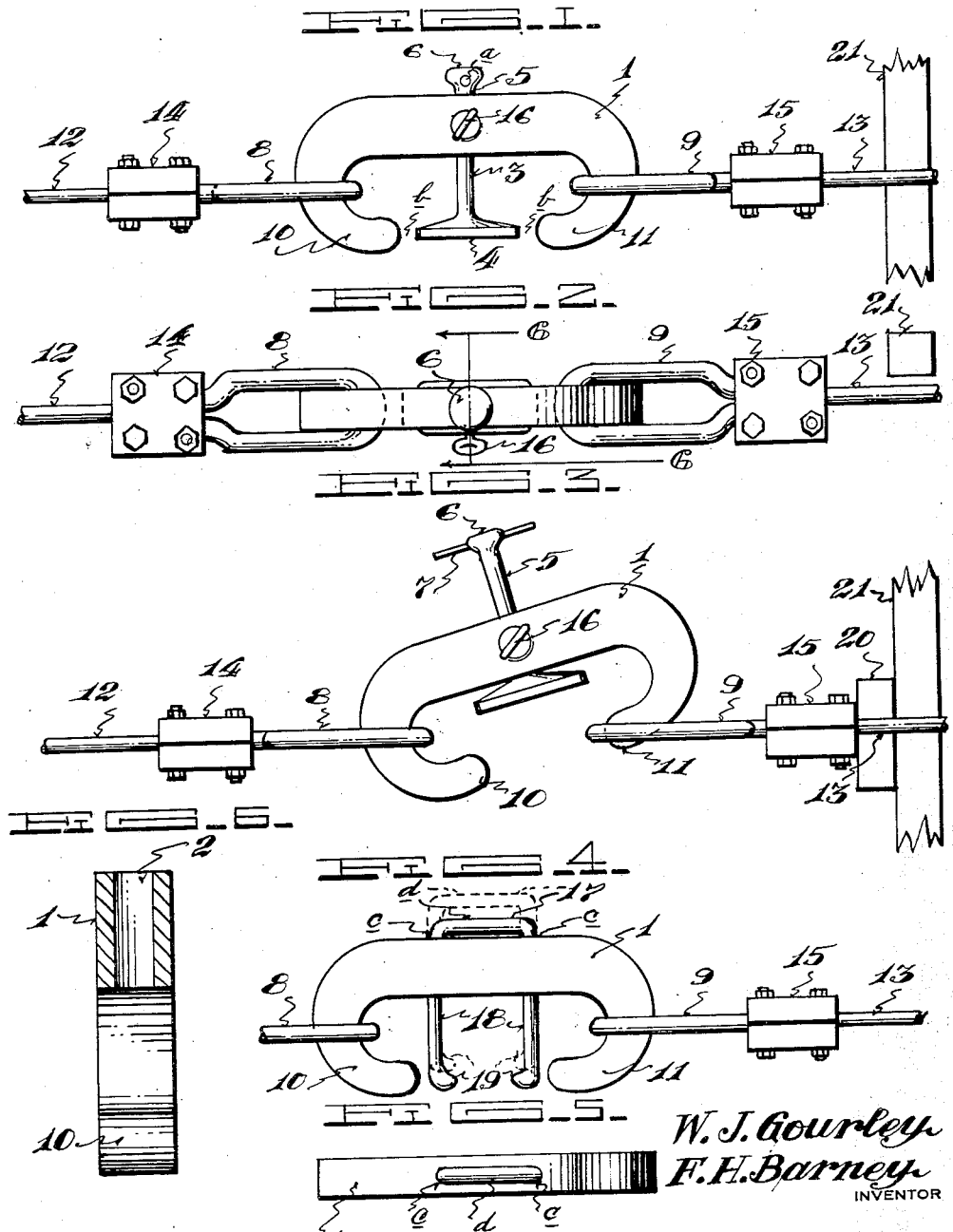
W. J. Gourley
F. H. Barney
INVENTOR
BY Cecil L. Wood
ATTORNEY Patented July 17, 1934

1,966,665

UNITED STATES PATENT OFFICE 1,966,665

C-LINK AND LOCK THEREFOR

William J. Gourley and Fred H. Barney, Fort Worth, Tex.

Application February 16, 1934, Serial No. 711,569

5 Claims. (Cl. 24—238)

This invention relates to oil field equipment and it has particular reference to a C-link or coupling, commonly called "hook-offs", for use in power lines for pump jacks, the line being connected at one end to an engine, motor, or other power in the central power plant some distance away from the well, and its opposite end to a pump jack in the well and its principle object resides in the provision of a device capable of hooking or connecting the power line together at some point along the length, such device being capable of removal or displacement at will thereby releasing the pump jack from the power stopping the pumping.

A further object of the invention is manifest in the provision of a C-link having a handle by which the same can be handled with perfect safety and without possible injury to the operator when it is desired to remove the link from the line disconnecting the same and at the same time provide a locking device to prevent the hooks on either end of the link from becoming disengaged from the loops or eyes in the ends of the power line.

A still further object of the invention resides in the provision of a C-link which is constructed in such a manner as to prevent its being spread or straightened while the line is in operation and becoming disengaged therefrom, as will be brought out more specifically as the description proceeds.

Broadly, the invention seeks to comprehend a provision of a C-link of the character designated above embodying a combination handle and locking device, the latter being provided to prevent the detachment of the said link while the handle is provided to expedite the manual disengagement of the link from the power line when desired.

While the foregoing objects are paramount, other and lesser objects will become manifest as the description proceeds taken in connection with the appended drawing wherein:

Figure 1 is an elevational view of the invention connected in a conventional power line showing the combination handle and locking device and the knock-off post.

Figure 2 is a plan view of the same.

Figure 3 is an elevational view of the invention showing one of the clamps abutting the knock-off post and how the invention may be removed or inserted into the line.

Figure 4 is an elevational view of a modified form of the invention.

Figure 5 is a plan view of Figure 4, and

Figure 6 is a cross sectional view taken on line 6—6 of Figure 2.

C-links have been made use of for several years in power lines such as designated and described in this specification but have been so constructed as to prevent their being handled with safety and speed when it is desired to connect or disconnect them from the power line. Some C-links, however, have been designed to provide a handle for such an operation but such links are of a design which affords a closed or slotted handle which is dangerous in that should the operator's hand be caught in the handle while the line is in operation, or if the line should break or the clamp should slip off the knock-off post while the operator was manipulating the C-link he could receive a serious injury.

Commonly, oil wells which have been put on a pump or operated from a remote point and by an engine, motor, or other power, which is commonly designated as a central power plant from which power lines extend radially in various directions to the pump jack situated at the wells. These lines consist usually of steel rods ⅞" to 1" in diameter and are of the best of steel of a tensil strength of from 75,000 to 90,000 pounds per square inch but these rods often break at a time when it is desired to remove the C-link and unless same safe means is provided to handle the latter, the operator may receive serious injury.

Accordingly, the invention is constructed, primarily, of a C-shaped body 1, preferably cut from a steel plate but which, obviously, can be cast if desired. The body 1 is of such thickness as to not only provide much strength but also of a sufficient width to accommodate an aperture 2 arranged vertically through the midsection of the body 1, as shown in Figures 1 and 6, through which the stem 3 of a locking device 4 is disposed for free movement therein.

The stem 3 or the locking device 4, when urged upwardly through the aperture 3, provides a convenient handle 5 having at its top a knob or enlarged portion 6 which is apertured at $a$ through which, if desired, a cross-bar 7 can be inserted.

When the locking device 4, the latter being integral to the stem 3, or it can be threaded thereon, if so desired, is shown in Figure 1 to be in its lowermost position rendering the passages at $b$ incapable of allowing the loop or connections 8 and 9 from passing therethrough causing the hooks 10 and 11 of the body 1 to disengage themselves from the line sections 12 and 13 which are connected to the loops or connections 8 and 9 by clamps 14 and 15.

When the handle 5 is not in use and it is desired to secure the locking device in the position as shown in Figure 1, the set screw 16 is threaded inwardly so that its inward end engages the stem 3 to prevent its being displaced.

Palpably, the handle 5, which is shown in the drawing to be movable through the main body 1, can be made integral with the said body 1 and project upwardly from the top thereof, eliminating the locking device. While the locking device is desirable in most cases, the invention can be utilized without the same by merely providing a convenient handle projecting upwardly, as stated, from the back of the main body 1 in the manner similar to that shown in Figure 3. The handle 5 is shown to be movable within the main body 1 yet capable of being secured at any position relative thereto.

Referring now to Figure 4, which is a modified form of the invention, it will be seen that the same C-shaped body 1 is utilized in this modification by a pair of apertures at c, somewhat smaller than those in the other figures, are provided to receive a substantially inverted U-shaped member 17, its two parallel prongs 18 extending downwardly terminating between the ends of the hooks 10 and 11 of the body 1, when in operation, each of the prongs 18 having an enlarged head 19 to prevent the member 17 from becoming dislodged or removed from the body 1.

When it is desired, therefore, to remove the form of link shown in Figure 4 from the line sections 12 and 13 by disengaging the hooks 10 and 11 of the body 1, the cross member d of the substantially U-shaped member 17 is grasped and pulled upwardly whereupon a suitable handle is provided simultaneously with the unlocking of the C-link by drawing the enlarged lower ends 19 of the prongs 18 upwardly and out of the opening between the ends of the hooks 10 and 11.

In operation, therefore, when it is desired to disconnect the link from the sections 12 and 13 of the power line, a block 20, or other article of sufficient strength, is placed against the knock-off post 21, as shown in Figure 3, so that the clamp 15 upon the back stroke of the pump (not shown) will bear against the said block 20 allowing a slack in the entire opposite section 12 of the line which, if the operator is agile and quick, will permit him to remove the link from the loops or connections 8 and 9 by grasping the knob 6 or cross-bar 7, after loosening the set screw 16 drawing the locking device 4 upwardly, as shown in Figure 3 grasping the handle 5 and pulling backwardly on the latter so as to withdraw the hook 11 of the link from the loop 9.

Obviously, if the block 20 should slip, causing the line section 13 to be quickly jerked while the link is being inserted or being removed, the operator might suffer an injury unless such a handle was provided which would enable him to disengage his hand from the latter very quickly.

Manifestly, the construction shown is capable of some modification and such modification as is considered within the scope and meaning of the appended claims is also considered within the spirit and intent of the invention.

What is claimed is:

1. In a C-link, a main body, a combination locking device and handle comprising a head and a stem, said stem arranged for vertical movement through the said main body, the said locking device normally disposed within the opening of the said C-link and capable of withdrawal therefrom by the said stem whereby a handle is provided and means to secure the said stem in varying positions.

2. In a C-link, a substantially C-shaped body, a locking device having a stem arranged for vertical movement through the midsection of the said body capable of manual withdrawal upwardly through the said body to unlock the said link and provide a handle therefor and means to secure the said stem against displacement.

3. A C-link comprising a substantially C-shaped body having an opening in one side thereof, a stem arranged for vertical movement through the midsection of the said C-shaped body and capable of being drawn upwardly therethrough to afford a handle, a locking device at the lowermost end of the said stem normally disposed within the said opening and means to secure the said stem against vertical displacement.

4. In a C-link, a substantially C-shaped body having an opening in one side thereof, a stem vertically disposed through one side of the said body and capable of vertical movement therein, a locking device secured to the lowermost end of the said stem capable of substantially closing the said opening, the said stem affording a handle when the same is urged upwardly moving the said locking device out of the said opening and means to secure the said stem in its uppermost or lowermost position.

5. In a C-link for pumping lines, a substantially C-shaped body having an opening in one side thereof, a stem capable of vertical movement through the said body having a locking device on its lowermost end affording a partial closure of the said opening when the latter is in its lowermost position, a handle afforded by the said stem when the latter is urged to its uppermost position and means to secure the said stem in the said body at its uppermost and lowermost position.

WILLIAM J. GOURLEY.
FRED H. BARNEY.